United States Patent [19]

Lee et al.

[11] Patent Number: 5,438,578
[45] Date of Patent: Aug. 1, 1995

[54] LIGHT-FREQUENCY CONTROL APPARATUS

[75] Inventors: Tekken Lee; Nobunari Takeuchi; Haruyoshi Uchiyama, all of Tokyo; Kaoru Shimizu; Tsuneo Horiguchi, both of Mito, all of Japan

[73] Assignees: Ando Electric Co., Ltd.; Nippon Telegraph and Telephone Corporation, both of Tokyo, Japan

[21] Appl. No.: 265,724

[22] Filed: Jun. 24, 1994

[30] Foreign Application Priority Data

Jun. 30, 1993 [JP] Japan .................................. 5-162932

[51] Int. Cl.6 .................................................. H01S 3/13
[52] U.S. Cl. ................................... 372/32; 250/201.1; 372/9; 372/20
[58] Field of Search .................... 372/9, 19, 20, 29, 32, 372/33; 250/201.1, 204, 205; 359/326

[56] References Cited

U.S. PATENT DOCUMENTS 4,354,271 10/1982 Hon .......................................... 372/19
5,141,321 8/1992 Tsuruoka .......................... 250/205 X Primary Examiner—John D. Lee
Attorney, Agent, or Firm—Finnegan, Henderson, Farabow, Garrett & Dunner

[57] ABSTRACT

A light frequency shifter repeatedly generates, at predetermined cycles, an optical signal, an optical frequency component of which varies in a stepped manner at fixed intervals, and timing generating circuit generates timing signals corresponding to this variation. Detecting mechanisms synchronize, with the timing signal, a frequency difference between a reference light frequency freely selected from the light frequency component and a feedback light frequency of feedback light fed back so as to conform to this reference light frequency, and detect this. Light frequency-regulated light source extracts an output optical signal circulating within a closed loop circuit controlling the light frequency in accordance with the frequency difference described above, and supplies this to a light output terminal, and feeds back a portion of the output optical signal to the detecting mechanism as the feedback light described above.

3 Claims, 3 Drawing Sheets

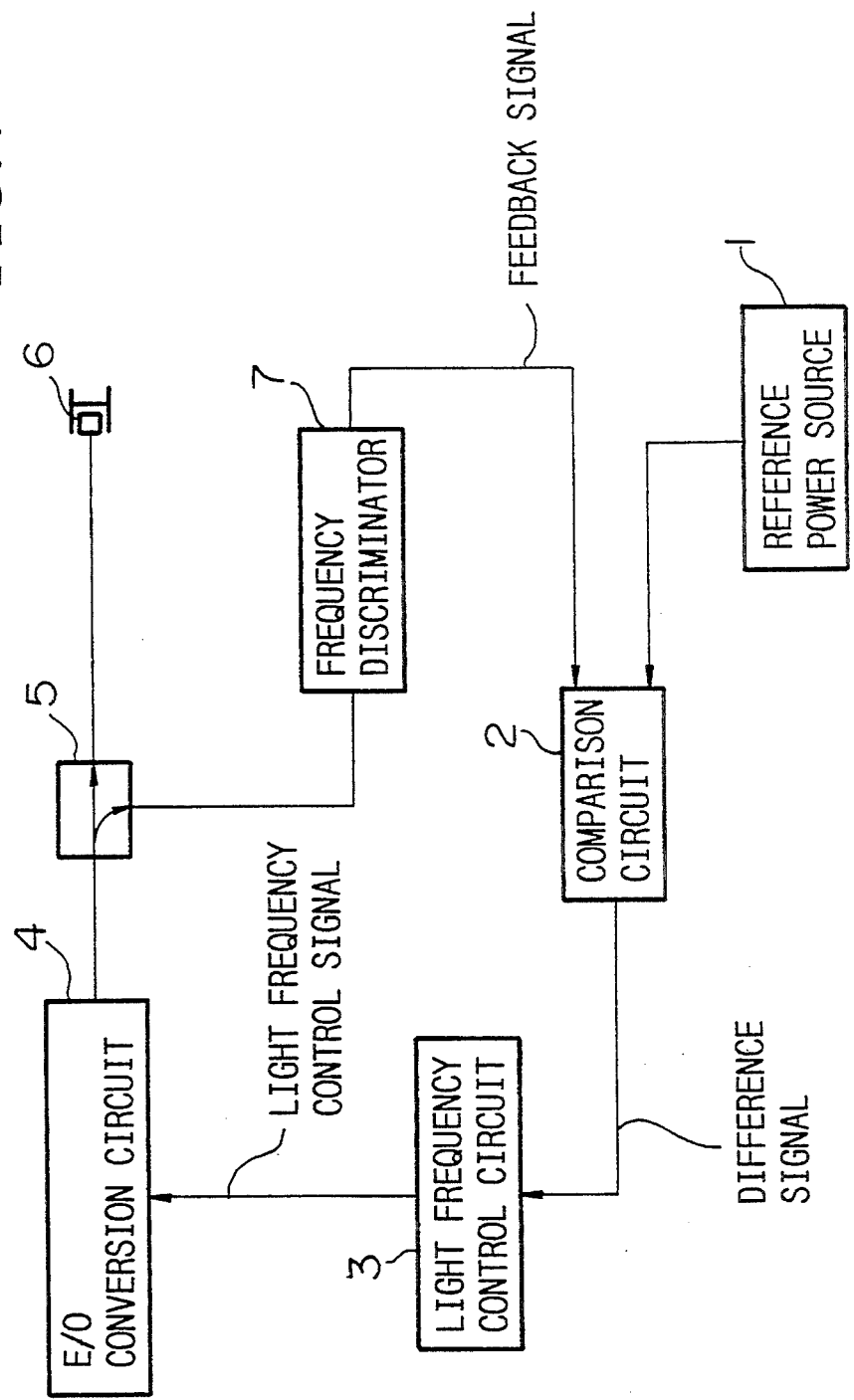

LIGHT-FREQUENCY CONTROL APPARATUS

BACKGROUND OF THE INVENTION

1. Field of the Invention

The present invention relates to a light-frequency control apparatus appropriate for use in, for example, the light source of a frequency multiplex transmission system or the like.

2. Prior Art

Recently, light-frequency control apparatuses which generate CW (continuous wave) light having a pre-specified light frequency have been developed, and an example of the structure thereof will be explained with reference to FIG. 4. In the Figure, reference numeral 1 indicates a reference power source which generates a reference voltage and outputs this as a reference signal. Reference numeral 2 indicates a comparison circuit, which compares the reference signal supplied to one input terminal and a feedback signal (described hereinbelow) supplied to the other input terminal, and generates a difference signal expressing the difference between the signals. Reference numeral 3 indicates a light frequency control circuit, which generates a light frequency control signal in accordance with the difference signal supplied from comparison circuit 2.

Reference numeral 4 indicates an E/O (Electrical signal to Optical signal) conversion circuit, which generates CW light having a light frequency corresponding to the light frequency control signal which is supplied from light frequency control circuit 4. Reference numeral 5 indicates an optical coupler which conducts the CW light outputted from E/O conversion circuit 4 to light output terminal 6, and supplies a portion of the CW light to light frequency discriminator 7. Light frequency discriminator 7 discriminates the light frequency of the CW light outputted from E/O conversion circuit 4 and generates an electrical signal in correspondence with this light frequency, and supplies this to comparison circuit 2 as the feedback signal described above.

In accordance with this type of structure, the CW light which is outputted from E/O conversion circuit 4 is inputted into light frequency discriminator 7 through the medium of optical coupler 5, and is converted into a feedback signal in correspondence with the light frequency of the CW light. Next, comparison circuit 2 compares this feedback signal with the reference signal, and based on the results of the comparison, the light frequency of the E/O conversion circuit 4 is controlled by means of the light frequency control signal which is generated by light frequency control circuit 3; that is to say, the feedback control of the closed loop is conducted.

In the conventional light-frequency control apparatuses described above, in the case in which the closed loop gain was sufficiently large, the degree of frequency stability of tile optical output signal was determined by the operational characteristics of the light frequency discriminator 7. Normally, there were a great number of cases in which a Fabry-Perot resonator was employed in the light frequency discriminator 7. However, Fabry-Perot resonators commonly possesses a plurality of resonance frequencies, so that it was unclear at which resonance point resonance would occur, and there were problems in that the absolute value of the light frequency was unclear, it was impossible to control the light frequencies extending over intervals greater than those between resonance points, and such resonators were susceptible to disturbances such as temperature or the like. Accordingly, in apparatuses employing light frequency discriminator 7 having such defects, there was a problem in that it was impossible to generate stable CW light at freely selected light frequencies.

SUMMARY OF THE INVENTION

The present invention was created in light of the above circumstances; it has as an object thereof to provide a light-frequency control apparatus which is capable of generating stable CW light at freely selected light frequencies.

In order to achieve the above object, the present invention is characterized in comprising a reference light-generating mechanism, which generates reference light, the light-frequency component of which varies in a stepped manner at specified intervals, repeatedly at pre-specified periods, and generates a timing signal in accordance with the variance; a detecting mechanism, which detects a frequency difference between a reference light frequency freely selected from among the light frequency components, and a feedback light frequency off feedback light which is fed back in such a manner as to conform to the reference light frequency, and synchronizes this with the timing signal; and an output light generating mechanism, which is provided with a closed loop circuit which controls the light frequency in accordance with the frequency difference, extracts an output optical signal circulating in this closed loop circuit, and supplies this to a light output terminal, and supplies a portion of this output optical signal to the detecting mechanism as the feedback light.

In accordance with the above structure, the reference light generating mechanism generates reference light, the light frequency component of which changes in a stepped manner at fixed periods, repeatedly at pre-specified periods, and generates a timing signal in correspondence with this variance, and the detecting mechanism detects a frequency difference between tile reference light frequency which is freely selected from among the light frequency components, and the feedback light frequency of the feedback light fed back in such a manner as to conform to this reference light frequency, and synchronizes this with the timing signal. In the output light generating mechanism, an output optical signal circulating within the closed loop circuit, which controls the light frequency in accordance with the frequency difference described above, is extracted and supplied to a light output terminal, and a portion of the output optical signal is fed back to the detecting mechanism as the feedback light. By means of tills, the light frequency of the output optical signal is controlled in such a manner as to cancel the frequency difference between the stable, freely selected, reference light frequency, and the feedback light frequency, so that stable output light is generated having a freely selected light frequency.

BRIEF DESCRIPTION OF THE DRAWINGS

FIG. 4 is a block diagram showing a comparative example.

DETAILED DESCRIPTION OF THE PREFERRED EMBODIMENTS

Hereinbelow, an embodiment of the present invention will be explained with reference to the Figures.

A. Structure of the Embodiment

Figure 1:
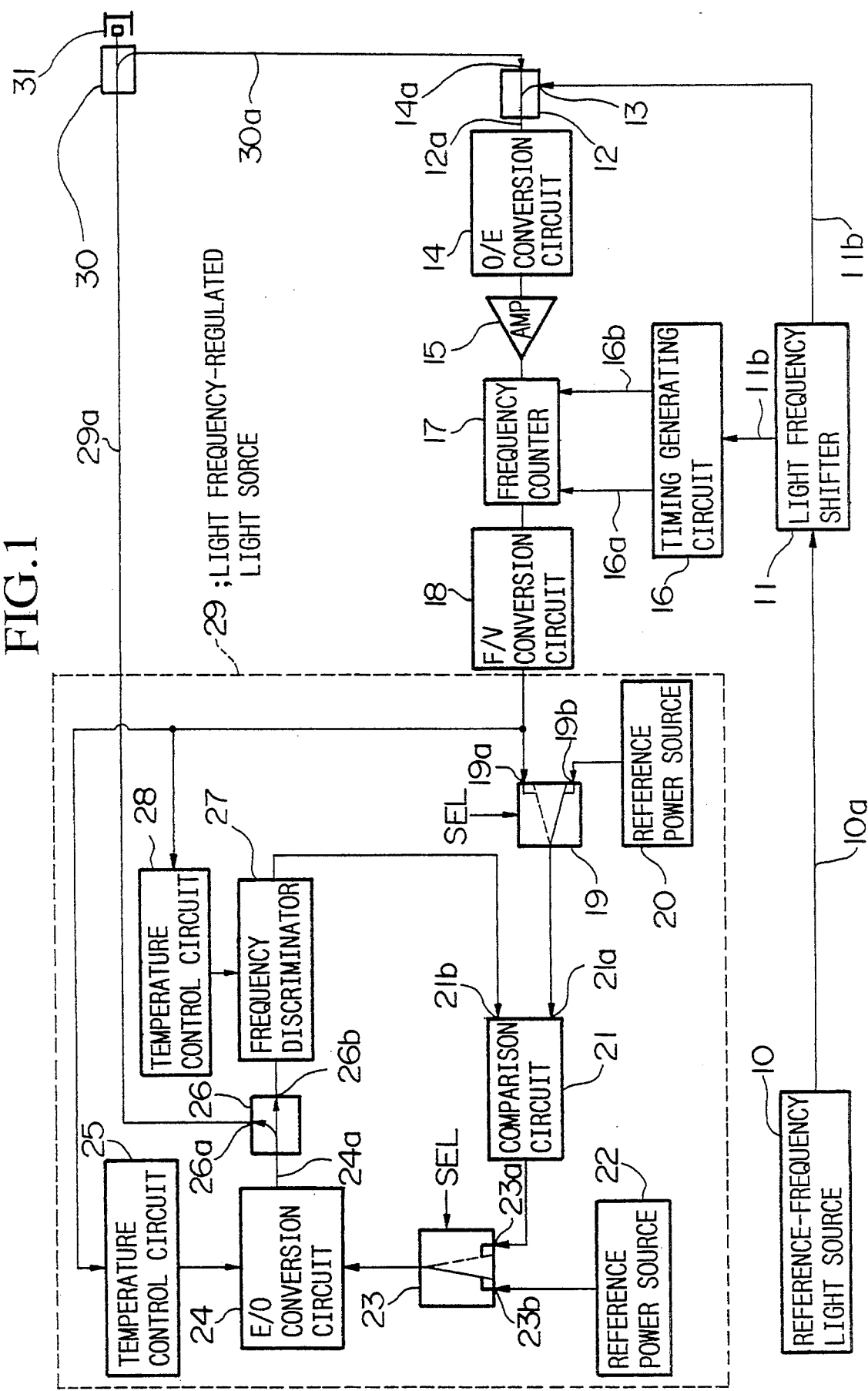
FIG. 1 is a block diagram showing the structure of an embodiment of the present invention.

FIG. 1 is a block diagram showing the overall structure of an embodiment in accordance with the present invention. In the Figure, reference numeral 10 indicates a reference frequency light source which generates an optical signal 10a, the light frequency of which is set to a pre-specified value.

Figure 2A:
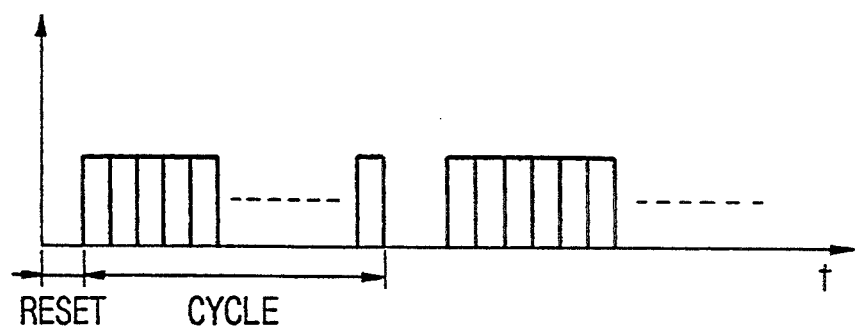
FIG. 2 is a diagram explaining the characteristics of optical signal 11a in the same embodiment.
Figure 2B:
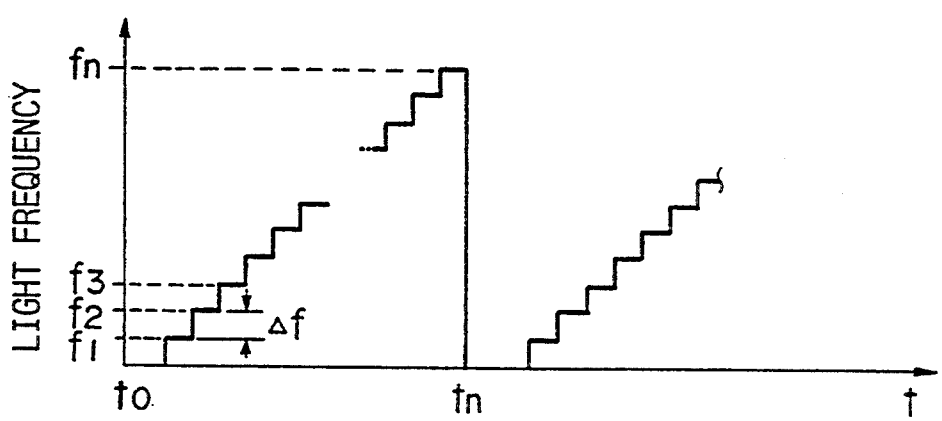

Reference numeral 11 indicates a light frequency shifter, which shifts tile light frequency of the optical signal 10a supplied from reference frequency light source 10; this shifter outputs an optical signal 11a (pulsed light sequence) in which the light frequency varies repeatedly in a stepped form at predetermined cycles. These cycles are illustrated in FIG. 2A. That is to say, in this light frequency shifter 11, as shown in FIG. 2B, if time is expressed by the variable t, and the light frequency is expressed by the variable f, then within a range in which $t_0 < t < t_n$, an optical signal 11a (pulsed light sequence) having a light frequency f which varies in a stepped form so that:

$$\begin{aligned} f &= f_1 & t_0 &< t < t_1 \\ f_2 &= f_1 + \Delta f & t_1 &< t < t_2 \\ f_3 &= f_1 + 2\Delta f & t_2 &< t < t_3 \\ f_n &= f_1 + (n-1)\Delta f & t_{n-1} &< t < t_n \end{aligned}$$

is repeatedly output at cycles of $1/t_n$.

Furthermore, light frequency shifter 11 generates and outputs a synchronization signal 11b which is synchronized with the repeating cycle $1/tn$. The details of this type of light frequency shifter 11 are disclosed in "Technique for translating light-wave frequency by using an optical ring circuit containing a frequency shifter, OPTICS LETTERS, Vol. 17, No. 18, Sep. 15, 1992", by Kaoru Shimizu.

Reference numeral 12 indicates an optical coupler, which mixes the optical signal 11a supplied to input terminal 13 and tile feedback optical signal 30a (described hereinbelow) supplied to input terminal 14a, and outputs an optical signal corresponding to the mixed result. This optical signal has a beat frequency component in accordance with the difference between the light frequency of the optical signal 11a described above and the light frequency of the feedback optical signal is produced in the output light 12a of this optical coupler 12. Reference numeral 14 indicates a O/E conversion circuit, which converts the optical signal delivered through optical coupler 12 to a beat frequency signal (electrical signal) in correspondence with the beat frequency described above. Reference numeral 15 indicates an amplifier which amplifies and outputs the beat frequency signal.

Reference numeral 16 indicates a timing generating circuit which generates timing signals 16a and 16b which are synchronized with the synchronization signal 11b outputted from light frequency shifter 11. Reference numeral 17 indicates a frequency counter, which counts tile frequencies of the beat frequency signal outputted from amplifier 15 based on time above-described timing signals 16a and 16b, and outputs this as frequency data. This frequency counter 17 is provided with a calculation function and a temporary storage function; it compares tile size relationships between first frequency data counted based on timing signal 16a (the prior timing), and second frequency data counted based on timing signal 16b (the later timing), determines the positive or negative sign of the second frequency data counted at the latter timing from the results of the comparison, and outputs second frequency data to which this sign has been appended to the following step. Reference numeral 18 indicates a frequency/voltage conversion circuit (hereinbelow referred to as a "F/V conversion circuit"), which converts frequency data supplied From frequency counter 17 to a voltage signal and outputs this.

The output of F/V conversion circuit 18 is supplied to light frequency-regulated light source 29. This light source 29 comprises component elements 19–28, and hereinbelow, these component elements 19–28 will be explained. First, reference numeral 19 indicates a selector, which conducts selection in accordance with a selection signal SEL of one of the signals inputted into input terminals 19a and 19b, and outputs this. That is to say, this selector 19 selects one or the other of the voltage signal inputted into input terminal 19a or the reference voltage signal supplied to input terminal 19b, in accordance with a selection signal SEL which is supplied from a control unit which is not depicted in the Figure, and outputs the selected signal to the following step. The reference voltage signal is outputted from reference power source 20.

Reference numeral 21 indicates a comparison circuit, which compares the signal supplied to input terminal 21a and the feedback signal 27a (discussed hereinbelow) supplied to input terminal 21b, and generates a deviation signal indicating the deviation of both signals. The output of selector 19 is supplied to Input terminal 21a, while a feedback signal 27a (described hereinbelow) outputted from frequency discriminator 27 is supplied to input terminal 21b. Reference numeral 23 indicates a selector which selects one or the other of the deviation signal inputted into input terminal 28a or the reference voltage signal supplied to input terminal 28b in accordance with the selection signal SEL, and outputs this to the following stage. The reference voltage signal which is supplied to input terminal 28b is outputted from reference power source 22.

Reference numeral 24 indicates an E/O conversion circuit, which generates an optical signal 24a having a light frequency corresponding to the output of selector 23. The light frequency of the optical signal 24a varies in accordance with the temperature control of temperature control circuit 25, and temperature control circuit 25 conducts the temperature control of E/O conversion circuit 24 based on a voltage signal outputted from the F/V converter 18 described above. Reference numeral 26 indicates an optical coupler, which outputs the optical signal 24a described above from output terminal 26a and supplies a portion of this optical signal 24a to frequency discriminator 27 from output terminal 26b.

Figure 3:
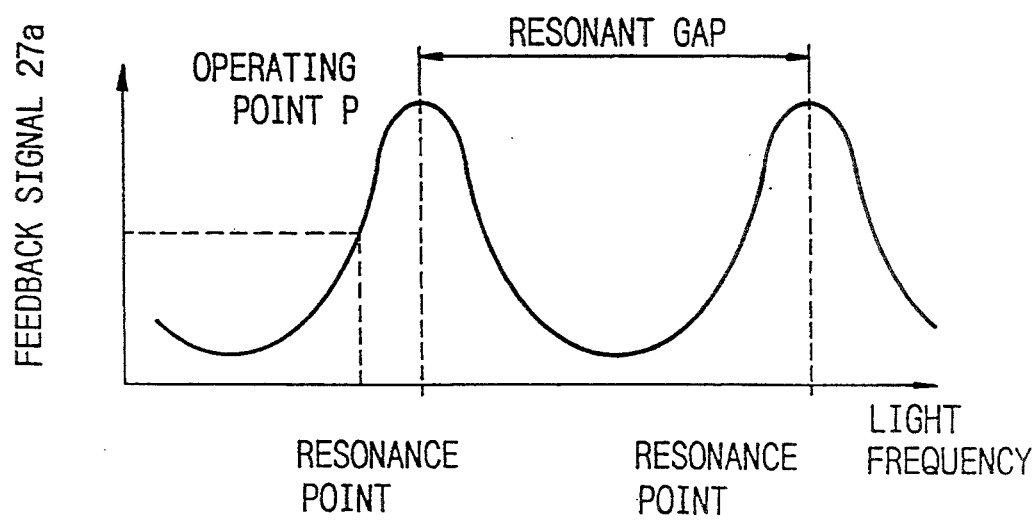
FIG. 3 is a diagram explaining the discrimination characteristics of frequency discriminator 27 in the same embodiment.

Frequency discriminator 27 is provided with, for example, a Fabry-Perot resonator formed from solid etalon, and discriminates the light frequency of the optical signal 24a supplied from optical coupler 26, generates an electric signal corresponding to the light frequency, and supplies this to the input terminal 21b of comparison circuit 21 as the above-described feedback signal 27a. This frequency discriminator 27 is structured so as to control the temperature of the Fabry-Perot resonator in accordance with the temperature control signal which is supplied from temperature control circuit 28. Temperature control circuit 28 generates a temperature control signal based on the electric signal outputted from the above-described F/V conversion circuit 18. That is to say, in this frequency discriminator 27, as shown in FIG. 3, temperature control is executed so that the intermediate point (half-value position) in the predetermined resonance points possessed by the Fabry-Perot resonator is used as the operating point P (discrimination characteristic point) of the Fabry-Perot resonator.

The optical signal 29a outputted from the light frequency-regulated light source 29 comprising the constituent elements 19–28 described above, that is to say, a portion of the optical signal 24a outputted from output terminal 26a of optical coupler 26, is inputted into optical coupler 30. Optical coupler 30 outputs optical signal 29a to optical output terminal 31, and supplies a portion of this optical signal 29a to the input terminal 14a of optical coupler 12 as the feedback optical signal 30a described above.

B. Operation of the Embodiment

Next, the operation of the light-frequency control apparatus having the above structure will be explained with reference to FIG. 1. First, if the wavelength of the optical signal 10a outputted from reference frequency light source 10 is taken to be, for example, 1.55 mm, then the light frequency $f_1$ becomes 193.4 THz. Accordingly, when the light frequency shifter 11 has a variation width Df of a light frequency fn of 100 MHz, a number off steps n of 1,000, and a step time width of 50 ms, then an optical signal 11a is generated in which tile light frequency fn varies repeatedly in a stepped manner at intervals of 50 ms (see FIG. 2), based on the optical signal 10a supplied from reference frequency light source 10, as shown by tile formulas below.

That is to say,

| | | |
|---|---|---|
| $f_1$ = 193.400000 THz | ... | 0 < t < 50 μs |
| $f_2$ = 193.400100 THz | ... | 50 μs < t < 100 μs |
| $f_3$ = 193.400200 THz | ... | 100 μs < t < 150 μs |
| . | . | . |
| $f_{100}$ = 193.410000 THz | ... | 5000 μs < t < μs |
| . | . | . |
| $f_n$ = 193.500000 THz | ... | 49950 μs < t < 50000 μs |
| $f_{n+1}$ = 193.400000 THz | ... | 50000 μs < t < 50050 μs |

In addition, optical signal 11a, the light frequency of which varies repeatedly in this manner, is combined with the feedback optical signal 30a described above in optical coupler 12.

Feedback optical signal 30a is outputted from light frequency-regulated light source 29 in the following manner. In this light source 29, selectors 19 and 23 are set to reference power sources 20 and 22, respectively, in accordance with a selection signal SEL which is supplied from a control unit which is not depicted in the Figure. By means of this, E/O conversion circuit 24 generates an optical signal 24a having a light frequency in accordance with the voltage signal outputted by reference power source 20, and this becomes optical signal 29a though the medium of optical coupler 26, and furthermore, passes through optical coupler 30 to become feedback optical signal 30a.

Here, for example, in the case in which a feedback optical signal 30a having a pre-specified light frequency $f_x$ is brought into approximate conformity with an optical signal 11a having a light frequency $f_{100}$ = 193.410000 THz, the following operations are conducted. First, when the feedback optical signal 30a having light frequency $f_x$ and the optical signal 11a having the light frequency $f_{100}$ are inputted into the optical coupler 12, as a result of the pass band characteristics of optical coupler 12, an optical signal having a beat frequency component of $|f_{100}-f_x|$, representing the frequency difference between these optical signals, is generated, and this is converted to a beat frequency signal through tile medium of O/E conversion circuit 14.

The beat frequency signal, the level of which is amplified via amplifier 15, is supplied to frequency counter 17. At this time, timing generating circuit 16 is at the point in time at which step n=100, that is to say, is synchronized with a timing at which light frequency shifter 11 generates light frequency $f_{100}$, and generates a timing signal 16a, and supplies this to frequency counter 17. Frequency counter 17 generates a counter value $fd0 = |f_{100}-f_x|$, based on timing signal 16a. Then, a counter value $fd0 = |f_{101}-f_x|$ is generated based on the timing signal 16b which is synchronized with tile following timing. Here, for example, if tile light frequency $f_x$ of feedback optical signal 30a is taken to be 193.409500 THz, then the counter value fd0 described above has tile following value.

$fd0 = |f_{100}-f_x| = 500$ MHz ... 5000 μs<t<5050 μs
$|f_{101}-f_x| = 600$ MHz ... 5050 μs<t<5100 μs

In frequency counter 17, a size comparison of the above-described counter values $|f_{100}-f_x|$ and $|f_{101}-f_x|$ is conducted, and polarity data "+1 (positive)" or "1 (negative)", expressing the polarity of $(f_{100}-f_x)$ are generated, in this case, $(|f_{100}-f_x| - |f_{101}-f_x|)$ is >0, so that the polarity data "+1" are generated. Next, the frequency counter 17 supplies frequency data obtained by means of the calculation $(f_{101}-f_x)\times$"+1"=500 MHz, based on the polarity data thus obtained, to F/V converter 18. By means of this, F/V conversion circuit 18 supplies a voltage signal corresponding to the amount of control to light frequency-regulated light source 29.

The voltage signal outputted by F/V conversion circuit 18 is inputted into temperature control circuits 25 and 28, respectively. Temperature control circuit 25 controls the temperature of E/O conversion circuit 24 in accordance with this voltage signal, and by means of this, controls the light frequency of the optical signal 24a which is generated by this circuit 24. Here, for example, in the case in which the E/O conversion circuit 24 comprises a distributed feedback type semiconducting laser having a InAaAs multiplex quantum well structure, then the light frequency $f_x$ varies in accordance with temperature control provided with a scale factor of 12 GHz/° K.

Accordingly, in the case corresponding to the above example, when temperature control is conducted so as to reduce the temperature of tile semiconducting laser to "0.042° K.", then tile light frequency $f_x$ increases by "504 MHz", and as a result, the light frequency $f_x$ of the optical signal 24a becomes 193.409500 MHz+504 MHz=193.410004 THz, and is thus brought into approximate conformity with the target value, light frequency $f_{100}$ (193.410000 THz). By conducting this control operation each cycle, that is to say, each 50 μs 1000 times=50 ms, an optical signal 24a is generated which has a light frequency $f_x$ which is brought into approximate conformity with the target value.

On the other hand, in the frequency discriminator 27 which is provided with a Fabry-Perot resonator, the discrimination characteristics are controlled by temperature control circuit 28. For example, the resonance frequencies of the Fabry-Perot resonator, which comprises solid etalon, vary according to a scale factor of 1.2 GHz/° C., as a result of temperature control. Temperature control circuit 28 conducts the temperature control of frequency discriminator 27 in accordance with tile voltage signal outputted by F/V converter 18, so as to maintain the discrimination characteristics of the Fabry-Perot resonator in a fixed manner. That is to say, as shown in FIG. 3, temperature control is conducted so that tile central point (mesial position) in the predetermined resonance points is made the operational point P of tile Fabry-Perot resonator.

When the light frequency $f_x$ of the optical signal 29a generated by the light frequency-regulated light source 29 is controlled so as to be approximately equal to the target light frequency in this manner, the light source 29 selects input terminals 19a and 23a of selectors 19 and 23, respectively, in accordance with a selection signal SEL which is supplied from a control unit which is not depicted in the Figure. As a result, in light source 29, a closed loop circuit, comprising constituent elements 21, 24, 26, and 27, is formed, and feedback control is executed.

That is to say, temperature control circuits 25 and 28 control the temperature of E/O conversion circuit 24 and frequency discriminator 27, respectively, in accordance with a voltage signal outputted by F/V converter 18, and in the state in which the light frequency of the feedback optical signal 30a is approximately set to the target light frequency $f_{100}$ the comparison circuit 21 forming the closed loop compares the voltage signal described above which is supplied via selector 19, and the feedback signal 27a supplied from frequency discriminator 27, and generates a difference signal expressing the difference in these two signals. This difference signal is inputted into E/O conversion circuit 24 through the medium of selector 23.

As described above, when the E/O conversion circuit 24 comprises a distributed feedback type semiconducting laser having a InAaAs multiplex quantum well structure, it is possible to vary the light frequency $f_x$ with a scale factor of 200 MHz/° K. by varying tile laser drive current. Accordingly, by conducting current control in accordance with this scale factor and the deviation signal described above, it is possible to bring the light frequency $f_x$ of optical signal 24a into complete conformity with the light frequency $f_{100}$ (193.410000 THz) which is the target value.

Next, the optical signal 24a, the light frequency $f_x$ of which has been controlled by means of this type of current control, is applied to the frequency discriminator 27, the temperature of which has been so controlled as to provide fixed discrimination characteristics, and is supplied to the input terminal 21b of comparison circuit 21 as a feedback signal 27a corresponding to this light frequency $f_x$. After this, in the closed loop circuit, feedback control is conducted so that the light frequency $f_x$ of optical signal 24a is constantly locked at the target light frequency. By conducting this feedback control operation at each cycle (50 ms), it is possible to stably maintain the light frequency $f_x$ of the optical signal at the target light frequency, and the stabilized optical signal 29a is outputted to an optical output terminal 31 via optical coupler 30, and a portion of the optical signal 29a is fed back to optical coupler 12 as feedback optical signal 30a.

As described above, the light frequency $f_x$ of optical signal 29a is corrected by means of the optical signal 11a which is outputted by light frequency shifter 11, and the degree of stability thereof depends on the degree of stability of the reference frequency light source 10 and the light frequency shifter 11. That is to say, the light frequency of the optical signal which is generated by the reference frequency light source 10 and the light frequency shifter 11 has an absolute value which is clear, and has a high degree of stability, so that the light frequency-regulated light source 29 is capable of producing CW light stabilized by means of a freely selected light frequency.

As is clear from the operation described above, in order to set the light frequency of the optical signal 29a outputted by the light frequency-regulated light source 29 to a desired light frequency, synchronization with a timing at which a target light frequency is generated, among the light frequencies $f_1 - f_n$ of the repeatedly varying optical signal 11a, may be conducted, and timing signals 16a and 16b may be generated, and by means of this, it becomes possible to generate a light frequency which is freely selected from among the light frequencies $f_1 - f_n$.

Furthermore, if a plurality of light frequency-regulated light sources 29 having the structure described above are provided, and the light frequency intervals of these light sources 29 are brought into conformity with the resonance intervals of the Fabry-Perot resonators, then it becomes possible to conduct closed loop control at the light frequencies allocated to the respective light sources 29, and to stably generate independent optical signals, so that such light sources are particularly appropriate for use as light sources in frequency multiplex transmission systems.

What is claimed is:

1. A light-frequency control apparatus comprising:
   reference light-generating means, which generates reference light, the light-frequency component of which varies in a stepped manner at specified intervals, repeatedly at pre-specified periods, and generates a timing signal in accordance with the variance;
   detecting means, which detects a frequency difference between a reference light frequency freely selected from among the light frequency components, and a feedback light frequency of feedback light which is fed back in such a manner as to conform to the reference light frequency, and synchronizes this with tile timing signal; and
   output light generating means, which is provided with a closed loop circuit which controls the light frequency in accordance with the frequency difference, extracts an output optical signal circulating in this closed loop circuit, and supplies this to a light output terminal, and supplies a portion of this output optical signal to tile detecting means as the feedback light.

2. A light-frequency control apparatus according to claim 1 wherein the output light generating means comprises:

an E/O conversion circuit and a frequency discriminator which are inserted in serial in tile closed-loop circuit; and control means for controlling operation points of the E/O conversion circuit and the frequency discriminator so as to decrease the frequency difference detected by the detecting means.

3. A light-frequency control apparatus according to claim 2 wherein the control means comprises temperature control circuits which control the operating points of the temperatures of the E/O conversion circuit and the frequency discriminator by controlling temperatures of them.

* * * * *

UNITED STATES PATENT AND TRADEMARK OFFICE
CERTIFICATE OF CORRECTION

PATENT NO. : 5,438,578
DATED : August 01, 1995
INVENTOR(S) : Tekken LEE et al.

It is certified that error appears in the above-indentified patent and that said Letters Patent is hereby corrected as shown below:

Claim 1, Column 8, Line 60, "tile" should read --the--.

Claim 1, Column 8, Line 67, tile" should read --the--.

Claim 2, Column 9, Line 5, "tile" should read --the--.

Signed and Sealed this

Eighteenth Day of February, 1997

Attest:

BRUCE LEHMAN

Attesting Officer   Commissioner of Patents and Trademarks